(12) United States Patent
Amano

(10) Patent No.: US 9,264,665 B2
(45) Date of Patent: Feb. 16, 2016

(54) TELECONFERENCING SYSTEM AND NON-TRANSITORY COMPUTER READABLE MEDIUM STORING PROGRAM

(71) Applicant: Katsuhiro Amano, Toyota (JP)

(72) Inventor: Katsuhiro Amano, Toyota (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 371 days.

(21) Appl. No.: 13/850,621

(22) Filed: Mar. 26, 2013

(65) Prior Publication Data

US 2013/0258043 A1    Oct. 3, 2013

(30) Foreign Application Priority Data

Mar. 28, 2012   (JP) ................................. 2012-074617

(51) Int. Cl.
```
H04L 12/16      (2006.01)
H04N 7/15       (2006.01)
H04M 3/42       (2006.01)
H04M 3/56       (2006.01)
H04L 12/18      (2006.01)
```

(52) U.S. Cl.
CPC .............. *H04N 7/15* (2013.01); *H04L 12/1831* (2013.01); *H04M 3/42221* (2013.01); *H04M 3/562* (2013.01); *H04N 7/155* (2013.01); *H04L 12/1863* (2013.01); *H04M 2203/5045* (2013.01)

(58) Field of Classification Search
CPC ........................ H04L 12/1831; H04L 12/1863
USPC ................... 348/14.01–14.16; 370/351–357, 370/229–271; 709/201–207, 217–248
See application file for complete search history.

(56) References Cited

U.S. PATENT DOCUMENTS

| | | | |
|---|---|---|---|
| 7,548,951 B2 | 6/2009 | Nagayama et al. | |
| 2005/0228861 A1 | 10/2005 | Nagayama et al. | |
| 2010/0165889 A1* | 7/2010 | Madabhushi et al. | 370/261 |
| 2010/0316199 A1* | 12/2010 | Martin, II | 379/88.08 |
| 2012/0274731 A1* | 11/2012 | Shanmukhadas et al. | 348/14.08 |
| 2013/0027509 A1* | 1/2013 | Ranganath et al. | 348/14.09 |

FOREIGN PATENT DOCUMENTS

| | | | |
|---|---|---|---|
| JP | 11-136368 A | 5/1999 | |
| JP | 4551668 B2 | 9/2010 | |

\* cited by examiner

*Primary Examiner* — Hemant Patel
(74) *Attorney, Agent, or Firm* — Banner & Witcoff, Ltd.

(57) ABSTRACT

A teleconferencing system includes a plurality of teleconferencing servers, a plurality of teleconferencing terminals, and a specification server. The plurality of teleconferencing servers are configured to be connected to one another through a network. Each of the plurality of teleconferencing terminals are configured to conduct a teleconference by transmitting and receiving media data to and from one another. Each one of the plurality of teleconferencing terminals is configured to be connected to one of the plurality of teleconferencing servers. The specification server is configured to be connected to the plurality of teleconferencing servers and is configured to specify a recording server that is configured to record the media data.

4 Claims, 15 Drawing Sheets

FIG. 6

| PATH | PATH SEGMENTS | | PATH SEGMENT DELAY TIME (ms) | | COMMUNICATION PATH TOTAL DELAY TIME |
|---|---|---|---|---|---|
| 50A | | | | | |
| C | XA | C->A | | 200 | | 200 |
| D | XA | D->A | | 200 | | 200 |
| E | XA | E->B | B->A | 200 | 200 | 400 |
| | | | | VARIANCE VALUE | 13333 |
| 50B | | | | | |
| C | XB | C->A | A->B | 200 | 100 | 300 |
| D | XB | D->A | A->B | 200 | 100 | 300 |
| E | XB | E->B | | 200 | | 200 |
| | | | | VARIANCE VALUE | 3333 |

FIG. 11

| PATH | | PATH SEGMENTS | | PATH SEGMENT PACKET LOSS RATE (%) | | COMMUNICATION PATH TOTAL PACKET LOSS RATE |
|---|---|---|---|---|---|---|
| 60A | | | | | | |
| C | XA | C->A | | 2.50 | | 2.50 |
| D | XA | D->A | | 2.00 | | 2.00 |
| E | XA | E->B | B->A | 1.30 | 1.50 | 2.80 |
| | | | | AVERAGE | | 2.43 |
| 60B | | | | | | |
| C | XB | C->A | A->B | 2.50 | 1.00 | 3.50 |
| D | XB | D->A | A->B | 2.00 | 1.00 | 3.00 |
| E | XB | E->B | | 1.30 | | 1.30 |
| | | | | AVERAGE | | 2.60 |

FIG. 15

| | PATH | PATH SEGMENTS | | PATH SEGMENT DEGREE OF DETERIORATION | | COMMUNICATION PATH TOTAL DEGREE OF DETERIORATION |
|---|---|---|---|---|---|---|
| C | XA | C->A | | 28.254 | | 28.254 |
| D | XA | D->A | | 25.551 | | 25.551 |
| E | XA | E->B | B->A | 22.200 | 23.000 | 45.200 |
| | | | | | AVERAGE | 33.002 |
| C | XB | C->A | A->B | 28.254 | 11.600 | 39.854 |
| D | XB | D->A | A->B | 25.551 | 11.600 | 37.151 |
| E | XB | E->B | | 22.200 | | 22.200 |
| | | | | | AVERAGE | 33.068 |

70A, 70B

TELECONFERENCING SYSTEM AND NON-TRANSITORY COMPUTER READABLE MEDIUM STORING PROGRAM

CROSS-REFERENCE TO RELATED APPLICATION

This application claims priority to Japanese Patent Application No. 2012-74617 filed on Mar. 28, 2012, the disclosure of which is herein incorporated by reference in its entirety.

BACKGROUND

The present disclosure relates to a teleconferencing system in which a teleconference is conducted through a network and to non-transitory computer readable medium storing a program that is used by the teleconferencing system.

A teleconferencing system that conducts a teleconference is known. In the teleconferencing system, teleconferencing terminals through which users' images and voices can be input and output are provided in a plurality of locations. The images and voices that are acquired by the individual teleconferencing terminals are relayed by a teleconferencing server. A teleconference is conducted by the combining and outputting of the images and voices by each of the teleconferencing terminals. For example, in a teleconferencing system, the teleconference is recorded by the teleconferencing server.

SUMMARY

In a teleconferencing system that is provided with a plurality of teleconferencing servers, in some cases a teleconference is conducted between a teleconferencing terminal that is connected to one of the teleconferencing servers and a teleconferencing terminal that is connected to another of the teleconferencing servers. In that case, the teleconference is conducted by the transmitting and receiving, through the one teleconferencing server and the other teleconferencing server, of the images and voices that are acquired by the individual teleconferencing terminals.

In a case where a teleconference is conducted through a plurality of teleconferencing servers, if all of the teleconferencing servers record the teleconference, the possibility arises that resources in the individual teleconferencing servers, such as CPUs, storage areas, and the like, will not be utilized efficiently. Moreover, in a case where one of the plurality of teleconferencing servers records the teleconference, the possibility arises that the teleconferencing server that is actually the best for recording the teleconference will not be specified.

Various configurations of the general principles herein provide a teleconferencing system and non-transitory computer readable medium storing a program that is able to record a teleconference by using an optimum teleconferencing server.

An aspect of the present disclosure provides a teleconferencing system that includes a plurality of teleconferencing servers, a plurality of teleconferencing terminals, and a specification server. The plurality of teleconferencing servers are configured to be connected to one another through a network. The plurality of teleconferencing terminals are configured to conduct a teleconference by transmitting and receiving media data to and from one another. Each one of the plurality of teleconferencing terminals is configured to be connected to at least one of the plurality of teleconferencing servers. The media data include at least one of image data and audio data. The specification server is configured to be connected to the plurality of teleconferencing servers and is configured to specify a recording server from the plurality of teleconferencing servers. The recording server is configured to record the media data. Each one of the plurality of teleconferencing servers includes a processor and a memory storing computer-readable instructions therein. The computer-readable instructions, when executed by the processor of the teleconferencing server, instructing the processor of the teleconferencing server to perform processes that include relaying all of the media data that are transmitted and received by the teleconference, detecting a communication quality level for the network which passes the media data that are transmitted and received between the teleconferencing server and each one of the plurality of teleconferencing terminals, transmitting to the specification server, through the network, the communication quality level that has been detected, and storing the media data that are relayed by the teleconferencing server in a storage device in response to receiving a recording start command. The recording start command is a command that instructs the recording server to start recording of the media data. The specification server includes a processor and a memory storing computer-readable instructions therein. The computer-readable instructions, when executed by the processor of the specification server, instruct the processor of the specification server to perform processes that include receiving the communication quality levels transmitted from the plurality of teleconferencing servers, specifying, based on the communication quality levels that have been received from the plurality of teleconferencing servers through the network, the recording server among the plurality of the teleconferencing servers, and transmitting the recording start command through network to the recording server that has been specified.

Another aspect of the present disclosure provides a non-transitory computer-readable medium storing computer-readable instructions that, when executed by a processor of a teleconferencing server, instruct the processor to perform processes that include relaying all media data that are transmitted and received through a network among a plurality of teleconferencing terminals that are configured to conduct a teleconference, each one of the plurality of teleconferencing terminals being configured to be connected to at least one of a plurality of teleconferencing servers through the network, the plurality of teleconferencing servers being configured to be connected to one another through the network, and the media data including at least one of image data and audio data, detecting a communication quality level for the network which passes the media data that are transmitted and received between the teleconferencing server and each one of the plurality of teleconferencing terminals, transmitting the detected communication quality level to a specification server through the network, the specification server being configured to be connected to the plurality of teleconferencing servers and being configured to specify a recording server that is configured to record the media data, and the recording server being at least one of the plurality of teleconferencing servers, and storing the media data that are relayed by the teleconferencing server in a storage device in response to receiving a recording start command The recording start command is a command that instructs the recording server to start recording of the media data.

Yet another aspect of the present disclosure provides a non-transitory computer-readable medium storing computer-readable instructions that, when executed by a processor of a specification server, instruct the processor to perform processes including receiving communication quality levels for a network which passes media data that are transmitted and received among a plurality of teleconferencing servers and a plurality of teleconferencing terminals, the communication quality levels having been received through the network from the plurality of teleconferencing servers, the plurality of teleconferencing servers being configured to be connected to one another and to the specification server through the network, the plurality of teleconferencing terminals being configured to conduct a teleconference by transmitting and receiving the media data to and from one another, the media data including at least one of image data and audio data, and the recording server being at least one of the plurality of teleconferencing servers, specifying a recording server from the plurality of teleconferencing servers based on the communication quality levels, the recording server being configured to record the media data, and transmitting a recording start command through the network to the recording server that has been specified, the recording start command being a command that instructs the recording server to start recording of the media data.

BRIEF DESCRIPTION OF THE DRAWINGS

Embodiments of the present disclosure will be described below in detail with reference to the accompanying drawings in which:

FIG. 6 is a figure that shows tables 50A, 50B, in which the communication quality levels of teleconferencing servers A, B are evaluated, according to the first embodiment;

FIG. 11 is a figure that shows tables 60A, 60B, in which the communication quality levels of the teleconferencing servers A, B are evaluated, according to the second embodiment;

FIG. 15 is a figure that shows tables 70A, 70B, in which the communication quality levels of the teleconferencing servers A, B are evaluated, according to the third embodiment.

DETAILED DESCRIPTION OF EXEMPLARY EMBODIMENTS

Figure 1:
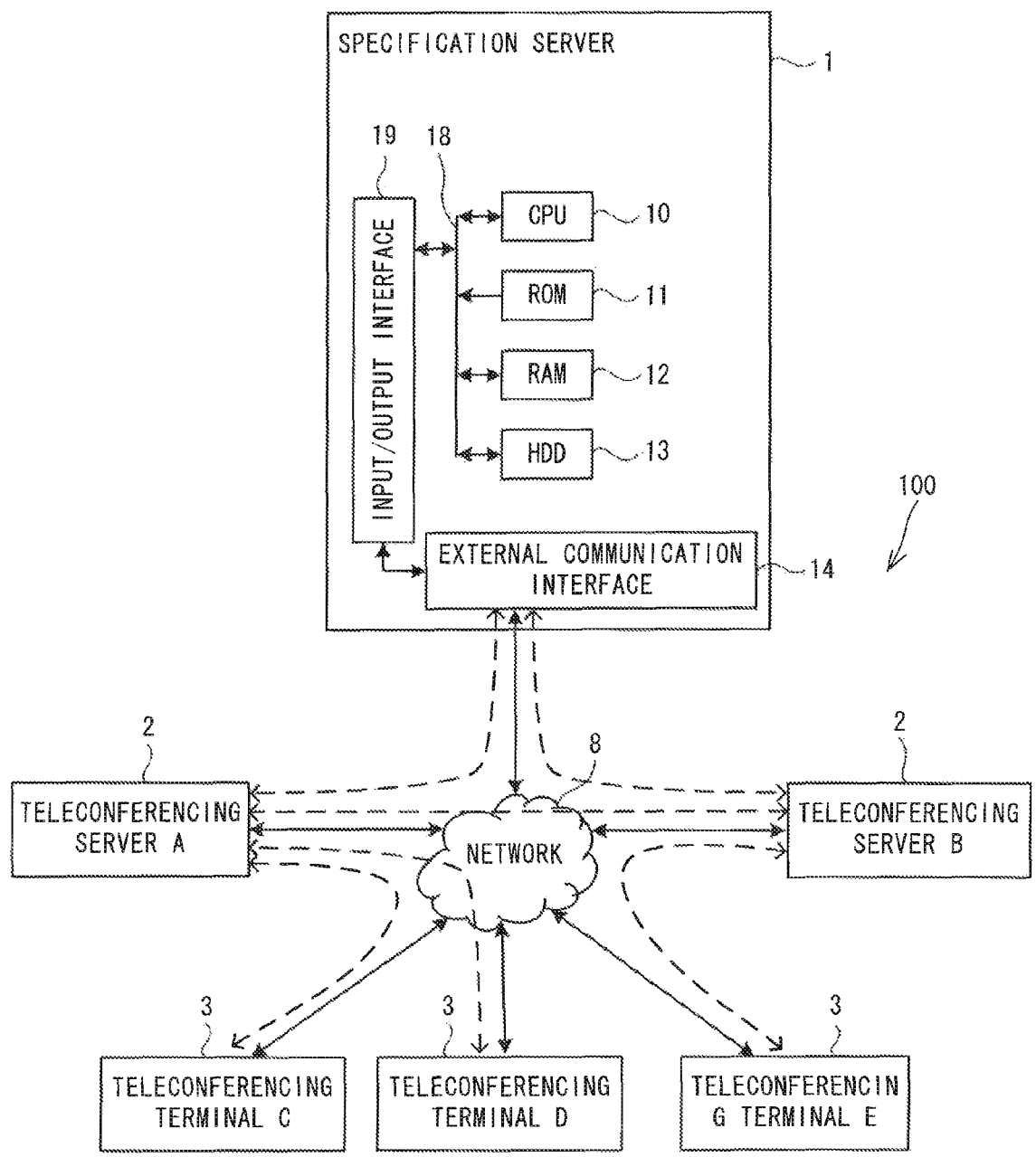
FIG. 1 is a diagram of the overall configuration of a teleconferencing system 100.

Embodiments of the present disclosure will be explained with reference to the drawings. The drawings are used for explaining technological features that the present disclosure can utilize. Device configurations, flowcharts for various types of processing, and the like that are shown in the drawings are merely explanatory examples and do not serve to restrict the present disclosure to those configurations, flowcharts, and the like.

A first embodiment of the present disclosure will be explained with reference to FIGS. 1 to 8. As shown in FIG. 1, a teleconferencing system 100 includes a specification server 1, a plurality of teleconferencing servers 2, and a plurality of teleconferencing terminals 3. The specification server 1, the plurality of teleconferencing servers 2, and the plurality of teleconferencing terminals 3 can be connected to one another through a network 8. The teleconferencing system 100 conducts a teleconference that utilizes images and voices. The teleconference is also called a television conference. The teleconferencing terminals 3 are used by users who participate in the teleconference. The teleconferencing servers 2 control the teleconference that is conducted among the plurality of teleconferencing terminals 3. The teleconferencing servers 2 are capable of recording the teleconference. The specification server 1 sets a recording server. The recording server is one of the plurality of teleconferencing servers 2, and performs the recording of the teleconference.

Each of the plurality of teleconferencing terminals 3 is connected to one of the plurality of teleconferencing servers 2 through the network 8. The plurality of teleconferencing servers 2 are connected to one another. The specification server 1 is connected to the plurality of teleconferencing servers 2. In the example of the teleconferencing system 100 that is shown in FIG. 1, one of the specification server 1, two of the teleconferencing servers 2, and three of the teleconferencing terminals 3 are provided. In a case where the two of the teleconferencing servers 2 are distinguished from one another, they are labeled the teleconferencing server A and the teleconferencing server B. In a case where the three of the teleconferencing terminals 3 are distinguished from one another, they are labeled the terminal C, the terminal D, and the terminal E. The terminal C and the terminal D are connected to the teleconferencing server A by public circuits. The terminal E is connected to the teleconferencing server B by a public circuit. The teleconferencing server A and the teleconferencing server B are connected to one another by a dedicated circuit and are connected to the specification server 1 by dedicated circuits. The public circuits and the dedicated circuits are collectively called the network 8.

Each of the teleconferencing terminals 3 is a terminal device to which are connected a camera, a microphone, a display, a speaker, an operation portion, and the like that are not shown in the drawings. During the teleconference, each of the teleconferencing terminals 3 transmits to the corresponding teleconferencing server 2 image data that have been acquired by the camera, audio data that have been acquired by the microphone, material data for documents, motion pictures, and the like that are used by the teleconference, and the like. In the explanation that follows, the data that are used during the teleconference, including the image data, the audio data, and the material data that have been acquired by the individual teleconferencing terminals 3, will be called the media data.

In a case where the teleconferencing servers 2 receive the media data from one of the teleconferencing terminals 3 that is connected for the teleconference, the teleconferencing servers 2 transmit the received media data to the other teleconferencing terminals 3 that are connected for the teleconference. Each of the teleconferencing terminals 3 creates and outputs teleconferencing data based on the media data it has received from the teleconferencing servers 2. For example, in a case where the terminal C outputs the teleconferencing data, the terminal C displays on its display the image data it has received from the terminals D, E and outputs through its speaker the audio data it has received from the terminals D, E. The media data that have been acquired by the individual teleconferencing terminals 3 are thereby shared within the teleconferencing system 100. Note that this form of teleconferencing control is the same as in known systems, so a detailed explanation will be omitted in the present embodiment.

The specification server 1 that is shown in FIG. 1 is a general-purpose server that has been configured to function as the specification server 1 by the installing of a specific program. The specification server 1 is provided with a CPU 10, a ROM 11, a RAM 12, an HDD 13, and an input/output interface 19, all of which are connected through a bus 18. An external communication interface 14 is connected to the input/output interface 19. The specification server 1 is connected to the network 8 by the external communication interface 14. Programs that cause the CPU 10 to perform recording server setting processing (refer to FIG. 5) and recording preparation processing (refer to FIG. 7), which will be described later, as well as an operating system (OS) and the like, are stored in the HDD 13. In order to install the programs in the HDD 13, the specification server 1 uses a reading device such as an optical drive or the like (not shown in the drawings) to read programs that are stored in a storage medium such as an optical medium or the like. Note that the specification server 1 may also install the programs in the HDD 13 by downloading the programs from another server through the external communication interface 14.

Figure 2:
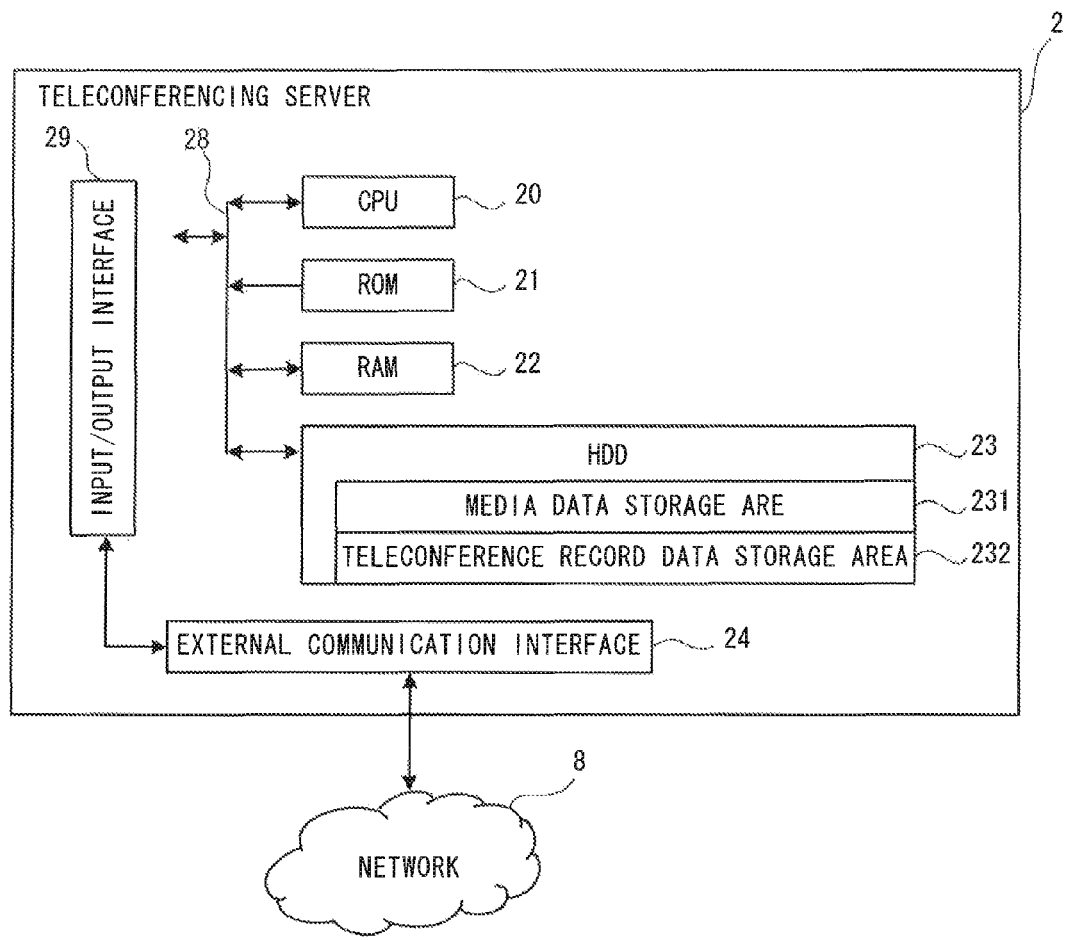
FIG. 2 is a block diagram that shows an electrical configuration of a teleconferencing server 2.

The teleconferencing server 2 that is shown in FIG. 2 is a general-purpose server that has been configured to function as the teleconferencing server 2 by the installing of a specific program. The teleconferencing server 2 is provided with a CPU 20, a ROM 21, a RAM 22, an HDD 23, and an input/output interface 29, all of which are connected through a bus 28. An external communication interface 24 is connected to the input/output interface 29. Various types of storage areas, such as a media data storage area 231, a teleconference record data storage area 232, and the like, are provided in the HDD 23. The media data that have been received from the teleconferencing terminals 3 are stored in the media data storage area 231. Teleconference record data, in which the teleconference is recorded, are stored in the teleconference record data storage area 232. Programs that cause the CPU 20 to perform communication quality measurement processing (refer to FIG. 4) and recording start processing (refer to FIG. 8), which will be described later, as well as an OS and the like, are stored in the HDD 23. In order to install the programs in the HDD 23, the teleconferencing server 2 uses a reading device such as an optical drive or the like (not shown in the drawings) to read programs that are stored in a storage medium such as an optical medium or the like. Note that the teleconferencing server 2 may also install the programs in the HDD 23 by downloading the programs from another server through the external communication interface 24.

The overall flow of a teleconference that is conducted by the teleconferencing system 100 will be explained with reference to FIG. 3. Hereinafter, a case in which a teleconference is conducted among the terminals C, D, E through the teleconferencing servers A, B will be explained as an example (refer to FIG. 1).

Figure 3:
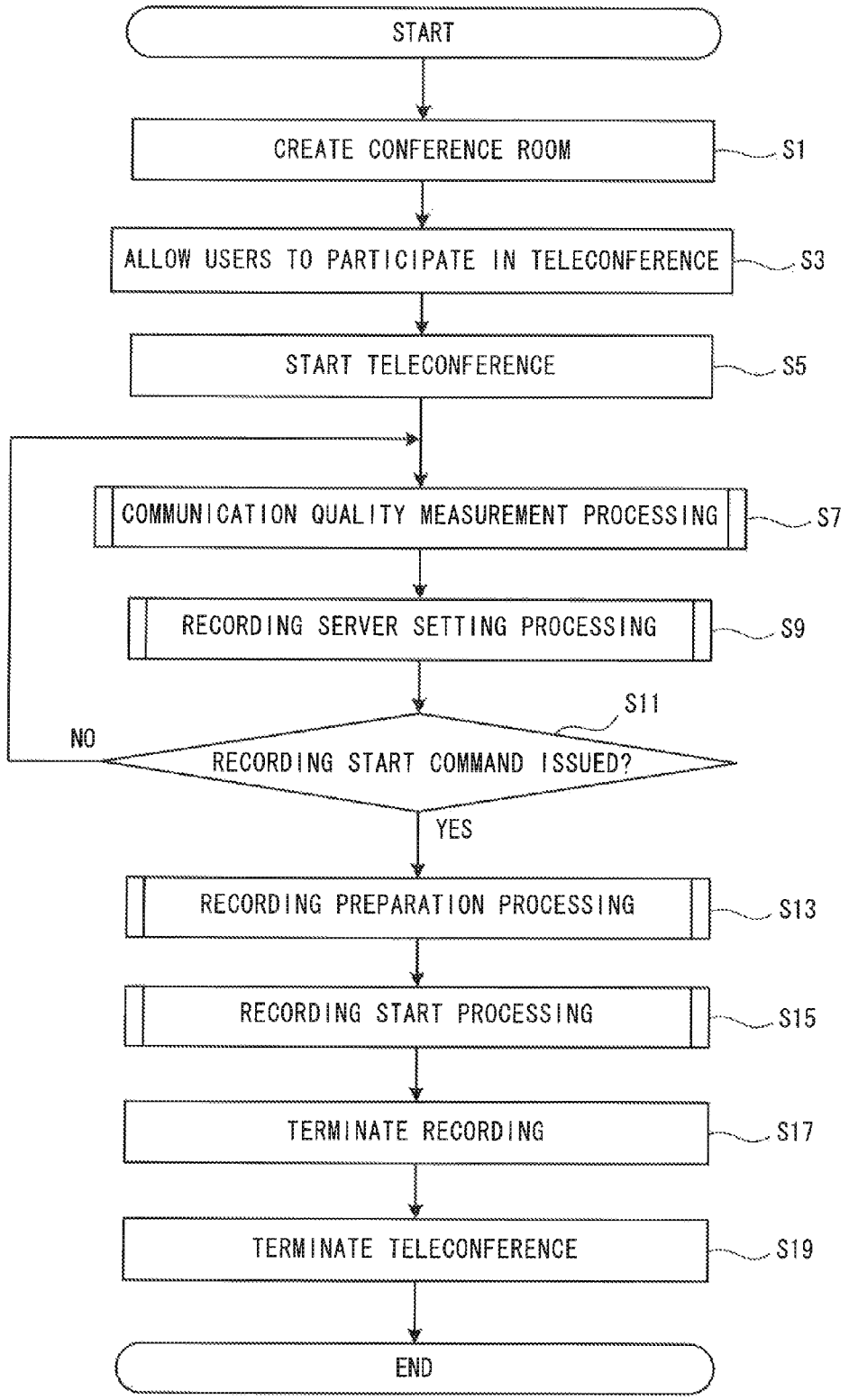
FIG. 3 is a flowchart that shows the overall flow of a teleconference that is conducted by the teleconferencing system 100.

As shown in FIG. 3, in the teleconferencing system 100, one of the users uses one of the teleconferencing terminals 3 to create a conference room on one of the teleconferencing servers 2 (Step S1). The conference room is a virtual space in which the teleconference is conducted. Assume, for example, that a user UC of the terminal C, acting as the host, creates a conference room Z on the teleconferencing server A. At that time, an instruction to create the conference room Z is transmitted from the terminal C to the teleconferencing server A. IDs for the teleconferencing terminals 3 that will be connected for the teleconference, a schedule for the teleconference, a conference ID that identifies the conference room Z, and the like are included in the instruction to create the conference room Z. The IDs of the teleconferencing terminals 3 include the IDs for the terminal C, the IDs for the terminal D, and the IDs for the terminal E. The IDs for the terminal C include an ID for identifying the terminal C and an ID for identifying the user UC. The IDs for the terminal D include an ID for identifying the terminal D and an ID for identifying a user UD. The IDs for the terminal E include an ID for identifying the terminal E and an ID for identifying a user UE. In the teleconferencing server A, the individual IDs for the terminal C, the terminal D, and the terminal E, as well as the schedule for the teleconference, are stored in association with the conference ID in the RAM 22.

Next, the teleconferencing server 2 on which the conference room has been created allows the teleconferencing terminals 3 of the users for whom the conference room was established to participate in the teleconference (Step S3). Specifically, the teleconferencing server A establishes connections among the terminal C, the terminal D, and the terminal E, the IDs for which are stored in the RAM 22. In the present embodiment, the teleconferencing server A establishes the connections with the terminal C and the terminal D without going through another teleconferencing server 2. The teleconferencing server A establishes the connection with the terminal E through the teleconferencing server B. At this time, the teleconferencing server A stores an ID for the teleconferencing server B in the RAM 22 of the teleconferencing server A in association with the ID for the terminal E. The teleconferencing server A is thus able to recognize all of the communication paths that connect the terminal C, the terminal D, and the terminal E with one another in the teleconference in the conference room Z. Note that the question of which of the teleconferencing terminals 3 will be connected to which of the teleconferencing servers 2 may be determined according to the IP addresses of the individual teleconferencing terminals 3, in the same manner as in known technologies.

The teleconferencing server A transmits to the teleconferencing server B the IDs that have been stored in the RAM 22 for the terminal C, the terminal D, and the terminal E, as well as the schedule for the teleconference, the conference ID, and ID for the teleconferencing server A, and the like. The teleconferencing server B stores the individual IDs for the terminal C, the terminal D, and the terminal E, as well as the schedule for the teleconference, in association with the conference ID in the RAM 22. At this time, the teleconferencing server B stores the ID for the teleconferencing server A in association with the individual IDs for the terminal C and the terminal D in the RAM 22 of the teleconferencing server B. Thus the teleconferencing server B is also able to recognize all of the communication paths that connect the terminal C, the terminal D, and the terminal E with one another in the teleconference in the conference room Z.

By the procedure that is described above, the terminal C and the terminal D are connected to the teleconferencing server A, the terminal E is connected to the teleconferencing server B, and a state is created in which the media data can be transmitted and received among the terminals C, D, and E. The teleconferencing server A allows the terminal C and the terminal D, for which direct connections to the teleconferencing server A have been established, and the terminal E, for which a connection to the teleconferencing server A has been established through the teleconferencing server B, to be admitted to the conference room Z, for which the conference ID is stored in the RAM 22.

Once all of the teleconferencing terminals 3 of the users for whom the conference room was established are participating in the teleconference, the teleconferencing server 2 on which the conference room has been created starts the teleconference (Step S5). Specifically, once the terminal C, the terminal D, and the terminal E have all been admitted to the conference room Z, the teleconferencing server A starts the teleconference in the conference room Z. The terminal C and the terminal D each transmit and receive packets of the media data to and from the other terminals through the teleconferencing server A. The terminal E transmits and receives packets of the media data to and from the other terminals through the teleconferencing server B. In other words, between the terminal C and the terminal D, the media data are transmitted and received through the teleconferencing server A. Between the terminal C and the terminal E, the media data are transmitted and received through the teleconferencing servers A and B. In the same manner, the media data are transmitted and received between the terminal D and the terminal E through the teleconferencing servers A and B. More specifically, the teleconferencing server A takes the packets of the media data from the terminal C and the terminal D and transmits them to the teleconferencing server B. The teleconferencing server A takes the packets of the media data from the terminal E via the teleconferencing server B and transmits them to the terminal C and the terminal D. In the same manner, the teleconferencing server B takes the packets of the media data from the terminal C and the terminal D via the teleconferencing server A and transmits them to the terminal E. The teleconferencing server B takes the packets of the media data from the terminal E and transmits them to the teleconferencing server A. That is, the teleconferencing servers A, B relay all of the packets of the media data that are transmitted and received during the teleconference in the conference room Z. In this manner, the teleconference proceeds among the terminals C, D, and E.

After the teleconference starts, plurality of teleconferencing servers 2 that control the teleconference perform the communication quality measurement processing (Step S7), which measures communication quality levels along the communication paths that are connected to each of the teleconferencing servers 2. Specifically, the teleconferencing servers A, B that control the teleconference in the conference room Z each perform the communication quality measurement processing. Based on the communication quality levels that are measured at Step S7, the specification server 1 performs the recording server setting processing (Step S9), which sets the recording server from among the plurality of teleconferencing servers 2. Specifically, the specification server 1 performs the recording server setting processing based on the communication quality levels that have been measured separately by the teleconferencing servers A, B. The communication quality measurement processing and the recording server setting processing will be described in detail later.

Next, the teleconferencing server 2 that created the conference room determines whether or not a recording start instruction has been issued (Step S11). In a case where an instruction to start recording the teleconference has been input to one of the teleconferencing terminals 3 that is participating in the teleconference, the teleconferencing server 2 that created the conference room determines that the recording start instruction has been issued (YES at Step S11). Specifically, if an instruction to start recording the teleconference in the conference room Z is input to one of the terminal C and the terminal D, a recording start command for the conference room Z is transmitted to the teleconferencing server A. If an instruction to start recording the teleconference in the conference room Z is input to the terminal E, a recording start command for the conference room Z is transmitted to the teleconferencing server A through the teleconferencing server B. When the teleconferencing server A receives the recording start command, the teleconferencing server A determines that the recording start instruction has been issued. In a case where the teleconferencing server 2 that created the conference room determines that the recording start instruction has been issued, information that indicates that the recording start instruction has been issued is transmitted to the specification server 1. In a case where the recording start instruction has not been issued (NO at Step S11), the processing returns to Step S7.

In a case where the recording start instruction has been issued (YES at Step S11), the specification server 1 performs the recording preparation processing (Step S13), which provides notification of the recording server to the plurality of teleconferencing servers 2 that control the teleconference. The specification server 1 also performs the recording start processing (Step S15), which starts the recording of the teleconference by the recording server. Specifically, the specification server 1 provides notification of the recording server to both the teleconferencing servers A, B and causes the one of the teleconferencing servers A, B that is the recording server to record the teleconference in the conference room Z. Thus the media data that are relayed by the recording server while the teleconference is being conducted in the conference room Z are stored in the media data storage area 231 (refer to FIG. 2) of the recording server.

In a case where the time has arrived to end the teleconference, according to the schedule that was established for the conference room, and in a case where an instruction to end the teleconference has been input to one of the teleconferencing terminals 3 that is participating in the teleconference, the recording server terminates the recording of the teleconference (Step S17). Specifically, in a case where the teleconferencing server A is the recording server, the teleconferencing server A references the schedule for the conference room Z that is stored in the RAM 22, and if the time has arrived to end the teleconference in the conference room Z, the teleconferencing server A terminates the recording of the teleconference in the conference room Z. In the same manner, in a case where the teleconferencing server B is the recording server, the teleconferencing server B references the schedule for the conference room Z that is stored in the RAM 22, and if the time has arrived to end the teleconference in the conference room Z, the teleconferencing server B terminates the recording of the teleconference in the conference room Z.

On the other hand, if an instruction to end the teleconference in the conference room Z has been issued from one of the terminal C and the terminal D, the command to end the teleconference in the conference room Z is transmitted to the teleconferencing server A, and the command to end the teleconference in the conference room Z is transmitted from the teleconferencing server A to the teleconferencing server B. If an instruction to end the teleconference in the conference room Z has been issued from the terminal E, the command to end the teleconference in the conference room Z is transmitted to the teleconferencing server B, and the command to end the teleconference in the conference room Z is transmitted from the teleconferencing server B to the teleconferencing server A. In a case where the teleconferencing server A is the recording server, when the teleconferencing server A receives the command to end the teleconference in the conference room Z, the teleconferencing server A terminates the recording of the teleconference in the conference room Z. In the same manner, in a case where the teleconferencing server B is the recording server, when the teleconferencing server B receives the command to end the teleconference in the conference room Z, the teleconferencing server B terminates the recording of the teleconference in the conference room Z.

Next, the teleconferencing terminals 3 of the users for whom the conference room was established withdraw from the conference room, and the plurality of teleconferencing servers 2 that control the teleconference terminate the teleconference (Step S19). Specifically, in a case where the time has arrived to end the teleconference in the conference room Z, and in a case where a command to end the teleconference in the conference room Z has been received, the teleconferencing server A terminates its connections with the terminal C, the terminal D, and the teleconferencing server B. The teleconferencing server A deletes the conference ID for the conference room Z from the RAM 22. In the same manner, in a case where the time has arrived to end the teleconference in the conference room Z, and in a case where a command to end the teleconference in the conference room Z has been received, the teleconferencing server B terminates its connections with the terminal E and the teleconferencing server A. The teleconferencing server B deletes the conference ID for the conference room Z from the RAM 22.

According to the processing that is described above, after the teleconference has been conducted, the media data that were used for the teleconference are stored in the media data storage area 231 of the recording server. Furthermore, in the recording server, the teleconference record data, which record the content of the teleconference, are created based on the media data that have been stored in the media data storage area 231 and are stored in the teleconference record data storage area 232 (refer to FIG. 2). A user can view a teleconference that was conducted in the past by replaying the teleconference record data.

The communication quality measurement processing (Step S7) that is performed by each of the teleconferencing servers 2 in the first embodiment will be explained with reference to FIG. 4. The CPU 20 of the teleconferencing server 2 receives packets from access point devices through the input/output interface 29 (Step S21). The access point devices are the teleconferencing terminals 3 and the other teleconferencing servers 2 that are participating in the teleconference and are connected to the teleconferencing server 2. As explained previously, when the teleconference is started, the access point devices transmit the packets of the media data to the teleconferencing server 2 to which they are connected. Each of the packets includes information such as the transmission time, a sequence number, the ID of the access point device that is the transmission source, the conference ID, and the like.

Next, the CPU 20 of the teleconferencing server 2 measures delay times based on the transmission and receiving times for the packets (Step S23). Specifically, by subtracting the transmission time that is included in the packet from the time that the packet was received, as measured by the teleconferencing server 2, the CPU 20 of the teleconferencing server 2 computes the delay time that occurs on a path segment that is connected to the teleconferencing server 2. The path segment is a communication path by which the access point device is connected to the teleconferencing server 2 without going through another teleconferencing server 2. The transmission time for the packet is set by a timer function that is provided in the OS of the access point device that transmits the packet. The receiving time for the packet is acquired by a timer function that is provided in the OS of the teleconferencing server 2 that receives the packet.

Next, the CPU 20 of the teleconferencing server 2 determines whether or not the measuring has been completed for all of the path segments (Step S25). Specifically, in a case where, among all of the access point devices that are connected to the teleconferencing server 2, there exists an access point device for which the delay time has not been measured, the CPU 20 of the teleconferencing server 2 determines that the measuring has not been completed for all of the path segments (NO at Step S25). In that case, the processing returns to Step S21. In contrast, in a case where the delay times have been measured for all of the access point devices that are connected to the teleconferencing server 2, the CPU 20 of the teleconferencing server 2 determines that the measuring has been completed for all of the path segments (YES at Step S25). In that case, the CPU 20 of the teleconferencing server 2 transmits all of the delay times that have been measured for the individual path segments to the specification server 1 as the communication quality levels for the teleconferencing server 2 (Step S27). In the communication quality levels for the teleconferencing server 2 that are transmitted at Step S27, the ID of the teleconferencing server 2 and the IDs of the access point devices are set as information that identifies the path segments that correspond to the individual delay times. Then the communication quality measurement processing is terminated.

Figure 5:
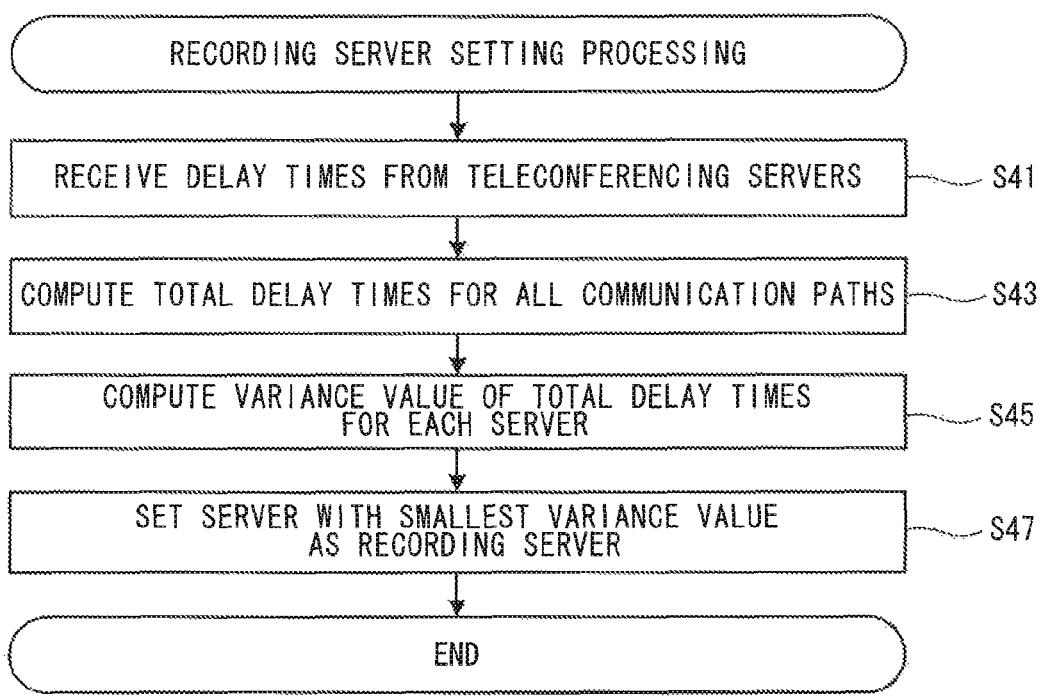
FIG. 5 is a flowchart of recording server setting processing according to the first embodiment.

The recording server setting processing (Step S9) that is performed by the specification server 1 will be explained with reference to FIG. 5. The CPU 10 of the specification server 1 receives the delay times from the teleconferencing servers 2 that are participating in the teleconference (Step S41). The specification server 1 thus acquires the delay times for all of the path segments that have been measured by each of the teleconferencing servers 2 that are participating in the teleconference. Specifically, the CPU 10 acquires from the teleconferencing server A, which created the conference room, the individual IDs for the terminal C, the terminal D, and the teleconferencing server B, which are three of the access point devices for the teleconferencing server A. The CPU 10 also acquires from the teleconferencing server B, which is one of the access point devices for the teleconferencing server A, the individual ID for the terminal E, which is also one of the access point devices for the teleconferencing server B. Based on the IDs that are acquired from the teleconferencing servers A, B, the CPU 10 specifies all of the path segments that are connected to one or the other of the teleconferencing servers A, B. The CPU 10 queries the teleconferencing servers A, B for the delay times until it has received all of the delay times that correspond to the specified path segments.

Next, based on all of the delay times that have been received from the teleconferencing servers 2, the CPU 10 computes the total delay times for all of the communication paths (Step S43). Specifically, for all of the communication paths that are formed between the teleconferencing servers 2 that conduct the teleconference and the teleconferencing terminals 3, the CPU 10 computes the total delay time that occurs on each individual communication path by adding up the delay times for the path segments that make up that communication path.

The CPU 10 also computes, for each of the teleconferencing servers 2, a variance value of all of the delay times in the communication paths that are connected to that teleconferencing server 2 (Step S45). The CPU 10 sets the teleconferencing server 2 that has the smallest computed variance value as the recording server (Step S47). The CPU 10 writes the ID of the recording server it has set to the RAM 12 and saves it, so the ID of the most recent recording server is stored in the RAM 12. Then the recording server setting processing is terminated. Note that other values corresponding to the variance value, e.g., a standard deviation of all of the delay times, may be additional or alternatively used.

A specific example of the method for setting the recording server according to the first embodiment will be explained in association with the communication quality measurement processing (FIG. 4) and the recording server setting processing (FIG. 5), with reference to FIG. 6. In order to facilitate understanding, the explanation that follows will use a table 50A that shows results of an evaluation of the communication quality levels for the teleconferencing server A and a table 50B that shows results of an evaluation of the communication quality levels for the teleconferencing server B.

In a case where the teleconferencing server A performs the communication quality measurement processing (Step S7), the terminal C, terminal D, and the teleconferencing server B are the access point devices. When the teleconferencing server A performs the communication quality measurement processing (FIG. 4), the CPU 20 of the teleconferencing server A measures separately the delay times for a path segment C→A from the terminal C to the teleconferencing server A, a path segment D→A from the terminal D to the teleconferencing server A, and a path segment B→A from the teleconferencing server B to the teleconferencing server A (Step S23). In this example, the delay times for the path segments C→A, D→A, and B→A are each 200 milliseconds.

In a case where the teleconferencing server B performs the communication quality measurement processing (Step S7), the terminal E and the teleconferencing server A are the access point devices. When the teleconferencing server B performs the communication quality measurement processing (FIG. 4), the CPU 20 of the teleconferencing server B measures the separate delay times for a path segment E→B from the terminal E to the teleconferencing server B and a path segment A→B from the teleconferencing server A to the teleconferencing server B (Step S23). In this example, the delay times for the path segments E→B and A→B are each 100 milliseconds.

As shown in the table 50A, in a case where a teleconference that is conducted among the terminals C, D, and E is recorded by a recording service XA that can be implemented by the teleconferencing server A, separate communication paths C→XA, D→XA, and E→XA that respectively transmit the media data from the terminals C, D, and E to the recording service XA are used. The communication path C→XA is the same as the path segment C→A. The communication path D→XA is the same as the path segment D→A. The communication path E→XA is the same as a combination of the two path segments E→B and B→A.

As shown in the table 50B, in a case where a teleconference that is conducted among the terminals C, D, and E is recorded by a recording service XB that can be implemented by the teleconferencing server B, separate communication paths that respectively transmit the media data from the terminals C, D, and E to the recording service XB are used. The communication path C→XB is the same as a combination of the two path segments C→A and A→B. The communication path D→XB is the same as a combination of the two path segments D→A and A→B. The communication path E→XB is the same as the path segment E→B.

When the recording server setting processing (FIG. 5) is performed by the specification server 1, the CPU 10 of the specification server 1 computes the total delay times for the communication paths C→XA, D→XA, and E→XA that are connected to the teleconferencing server A as 200, 200, and 400 milliseconds, respectively, based on the delay times for the individual path segments that were computed by the teleconferencing servers A, B (Step S43). More specifically, the CPU 10 specifies the path segments that make up the communication paths C→XA, D→XA, and E→XA, based on the access point device IDs that were acquired from the teleconferencing servers A, B at Step S41. The CPU 10 computes the total delay time for each of the communication paths C→XA, D→XA, and E→XA by adding up the delay times for the path segments that make up each of the communication paths.

In the same manner, the CPU 10 computes the total delay times for the communication paths C→XB, D→XB, and E→XB that are connected to the teleconferencing server B as 300, 300, and 200 milliseconds, respectively (Step S43). More specifically, the CPU 10 specifies the path segments that make up the communication paths C→XB, D→XB, and E→XB, based on the access point device IDs that were acquired from the teleconferencing servers A, B at Step S41. The CPU 10 computes the total delay time for each of the communication paths C→XB, D→XB, and E→XB by adding up the delay times for the path segments that make up each of the communication paths.

The CPU 10 also computes the variance value of all of the delay times for the teleconferencing server A as 13333 and computes the variance value of all of the delay times for the teleconferencing server B as 3333 (Step S45). The CPU 10 sets the teleconferencing server B, for which the variance value is the smallest, as the recording server (Step S47).

Figure 7:
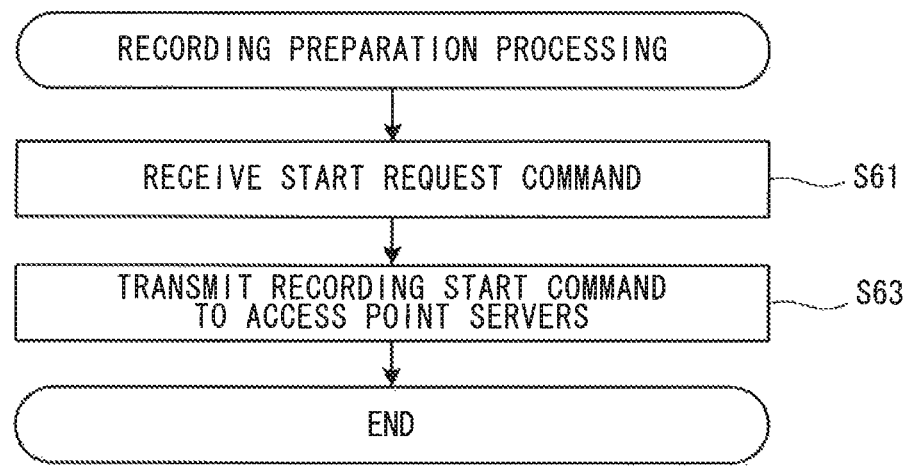
FIG. 7 is a flowchart of recording preparation processing.

The recording preparation processing (Step S13) that is performed by the specification server 1 will be explained with reference to FIG. 7. First, the CPU 10 receives a start request command (Step S61). The start request command is a command that, in a case where the previously described recording start instruction has been issued from one of the teleconferencing terminals 3, instructs the teleconferencing server 2 that is connected to that teleconferencing terminal 3 to transmit a request for a recording server designation to the specification server 1. The start request command includes the ID of the teleconferencing terminal 3 that issued the recording start instruction, the ID of the teleconferencing server 2 that is the transmission source, the conference ID of the conference room for which the recording will be performed, and the like.

Next, the CPU 10 transmits the recording start command to all of the teleconferencing servers 2 that are participating in the teleconference (Step S63). The recording start command is a command that designates the recording server and instructs the recording server to start the recording of the teleconference. The recording start command includes the ID of the recording server and the conference ID of the conference room for which the recording will be performed. More specifically, the CPU 10 queries all of the teleconferencing servers 2 that are connected to the specification server 1 and specifies the teleconferencing servers 2 that have the conference ID of the conference room for which the recording will be performed stored in their RAMs 22. The CPU 10 transmits the recording start command to all of the specified teleconferencing servers 2. Note that the recording start command may also be transmitted only to the recording server that was set at Step S47. The recording preparation processing is then terminated.

Figure 8:
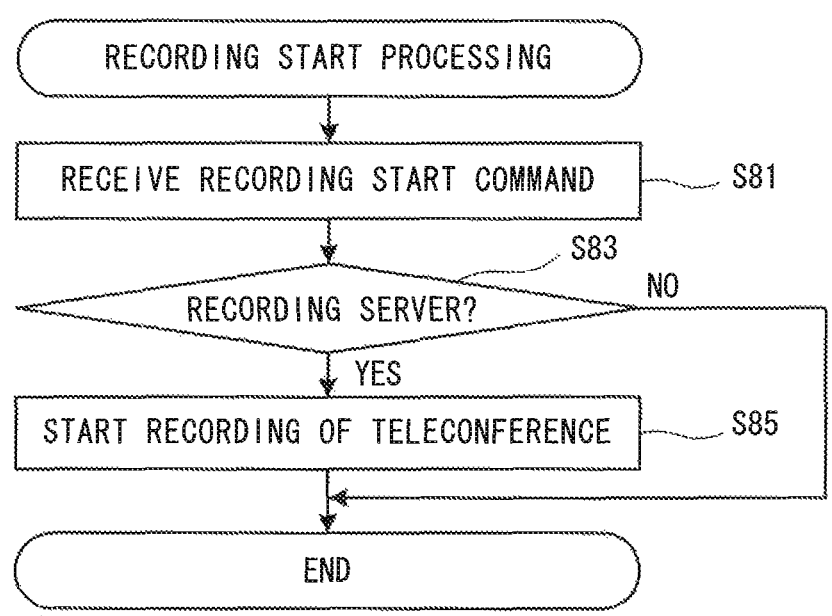
FIG. 8 is a flowchart of recording start processing.

The recording start processing (Step S15) that is performed by each of the teleconferencing servers 2 will be explained with reference to FIG. 8. First, the CPU 20 of the teleconferencing server 2 receives the recording start command (Step S81). Next, the CPU 20 determines whether or not the teleconferencing server 2 is the recording server that is designated by the recording start command (Step S83). Specifically, in a case where the conference ID that is stored in the RAM 22 matches the conference ID that is included in the recording start command and the ID of the teleconferencing server 2 matches the recording server ID that is included in the recording start command, the CPU 20 determines that the teleconferencing server 2 is the recording server (YES at Step S83). In that case, the CPU 20 starts the recording of the teleconference for the conference room with the conference ID that is included in the recording start command (Step S85). That is, as described previously, the CPU 20 stores the media data that the teleconferencing server 2 relays in the media data storage area 231 of the teleconferencing server 2. After Step S85 is performed, as well as in a case where the teleconferencing server 2 is not the recording server (NO at Step S83), the recording start processing is terminated.

As explained previously, in the teleconferencing system 100 according to the first embodiment, the teleconferencing server 2 measures the quality levels of the communication with each of the teleconferencing terminals 3 through the network 8 and transmits the measured communication quality levels to the specification server 1. The specification server 1 specifies the recording server based on the communication quality levels it has received from each of the teleconferencing servers 2 and transmits the recording start command to the specified recording server. The teleconferencing server 2 to which the recording start command is input stores the media data that the teleconferencing server 2 relays in the media data storage area 231. It is thus possible, based on the communication quality level of the network 8 for each of the teleconferencing servers 2, to cause the optimum teleconferencing server 2 to perform the recording of the teleconference.

More specifically, the specification server 1 specifies, as the recording server, the teleconferencing server 2 that has the shortest delay time for the data that are transmitted and received among the teleconferencing servers 2 and the teleconferencing terminals 3. Therefore, the teleconference can be recorded with a higher quality, while the data delays that occur during network communication are limited. Moreover, using the variance values for the plurality of delay times that are measured for each of the plurality of teleconferencing terminals 3 not only makes it possible to specify the recording server based on more accurate delay times, but also improves the quality of the recording of the teleconference.

A second embodiment of the present disclosure will be explained with reference to FIGS. 9 to 11. The second embodiment differs from the first embodiment in the details of the method for setting the recording server. Hereinafter, only the points in the second embodiment that are different from the first embodiment will be explained.

The communication quality measurement processing (Step S7) that is performed by each of the teleconferencing servers 2 in the second embodiment will be explained with reference to FIG. 9. First, in the same manner as at Step S21 in FIG. 4, the CPU 20 of the teleconferencing server 2 receives the packets from the access point devices (Step S101). Next, the CPU 20 measures a packet loss rate based on the sequence numbers of the packets (Step S103). Specifically, the CPU 20 computes the packet loss rate (percentage) that occurs on a path segment that is connected to the teleconferencing server 2 by specifying a number of lost packets based on the sequence numbers of the packets that are sequentially received by the teleconferencing server 2 per unit of time.

Figure 4:
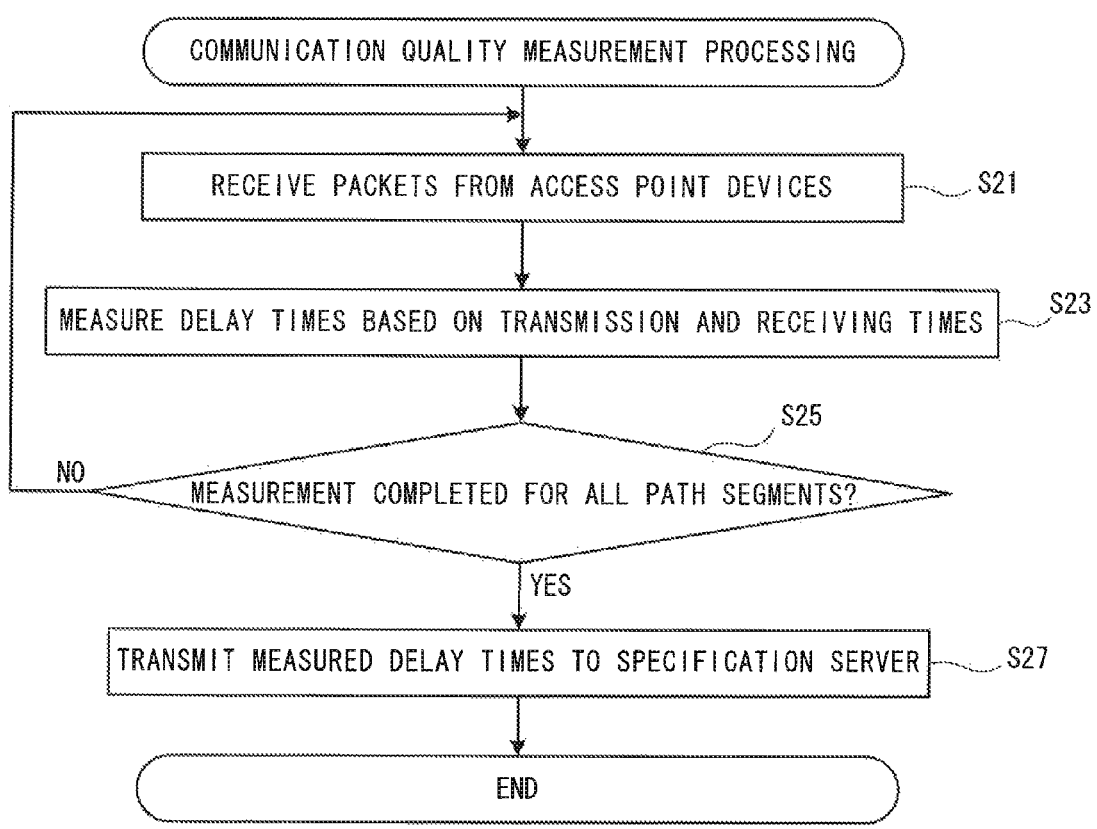
FIG. 4 is a flowchart of communication quality measurement processing according to a first embodiment.

Then, in the same manner as at Step S25 in FIG. 4, the CPU 20 determines whether or not the measuring has been completed for all of the path segments (Step S105). In a case where the measuring has not been completed for all of the path segments (NO at Step S105), the processing returns to Step S101. In contrast, in a case where the measuring has been completed for all of the path segments (YES at Step S105), all of the packet loss rates that have been measured for the individual path segments are transmitted to the specification server 1 as the communication quality levels for the teleconferencing server 2 (Step S107). In the packet loss rates that are transmitted at Step S107, the ID of the teleconferencing server 2 and the IDs of the access point devices are set as information that identifies the path segments that correspond to the individual packet loss rates. Then the communication quality measurement processing is terminated.

The recording server setting processing (Step S9) that is performed by the specification server 1 in the second embodiment will be explained with reference to FIG. 10. First, in the same manner as at Step S41 in FIG. 5, the CPU 10 of the specification server 1 receives the packet loss rates from the teleconferencing servers 2 that are participating in the teleconference (Step S121). Next, based on the packet loss rates that have been received from all of the teleconferencing servers 2, the CPU 10 computes the total packet loss rates for all of the communication paths (Step S123). Specifically, for all of the communication paths that are formed between the teleconferencing servers 2 that conduct the teleconference and the teleconferencing terminals 3, the CPU 10 computes the total packet loss rate that occurs on each individual communication path by using the packet loss rates for the path segments that make up that communication path. More specifically, the CPU 10 computes a packet survival rate (percentage) for each of the path segments by subtracting the packet loss rate from 100. Then the CPU 10 computes the total packet survival rate for a given communication path by multiplying the packet survival rates for all of the path segments that make up that communication path. The CPU 10 computes the total packet loss rate for the communication path by subtracting the total packet survival rate from 100.

Next, for each of the teleconferencing servers 2, the CPU 10 computes a representative value of the total packet loss rates of all of the communication paths that are connected to that teleconferencing server 2 (Step S125). The representative value may be an average, median, mode, and the like of all of the communication paths. The CPU 10 sets the teleconferencing server 2 that has the smallest computed average value as the recording server (Step S127). Then the recording server setting processing is terminated.

A specific example of the method for setting the recording server according to the second embodiment will be explained in association with the communication quality measurement processing (FIG. 9) and the recording server setting processing (FIG. 10), with reference to FIG. 11. In order to facilitate understanding, the explanation that follows will use a table 60A that shows results of an evaluation of the communication quality levels for the teleconferencing server A and a table 60B that shows results of an evaluation of the communication quality levels for the teleconferencing server B.

When the teleconferencing server A performs the communication quality measurement processing (FIG. 9), the CPU 20 of the teleconferencing server A measures separately the packet loss rates for the path segments C→A, D→A, and B→A (Step S103). In this example, the packet loss rates for the path segments C→A, D→A, and B→A are respectively 2.50%, 2.00%, and 1.50%. When the teleconferencing server B performs the communication quality measurement processing (FIG. 9), the CPU 20 of the teleconferencing server B measures the separate packet loss rates for the path segments E→B and A→B (Step S103). In this example, the packet loss rates for the path segments E→B and A→B are respectively 1.30% and 1.00%.

As shown in the tables 60A, 60B, when the recording server setting processing (FIG. 10) is performed by the specification server 1, the CPU 10 of the specification server 1 computes the total packet loss rates for the communication paths C→XA, D→XA, and E→XA for the teleconferencing server A as 2.50%, 2.00%, and 2.78%, respectively, based on the packet loss rates for the individual path segments that were computed by the teleconferencing servers A, B (Step S123). More specifically, the CPU 10 specifies the path segments that make up the communication paths C→XA, D→XA, and E→XA, based on the access point device IDs that were acquired from the teleconferencing servers A, B at Step S41. The CPU 10 computes the total packet loss rate for each of the communication paths C→XA, D→XA, and E→XA by multiplying the packet survival rates for the path segments that make up each of the communication paths.

In the same manner, the CPU 10 computes the total packet loss rates for the communication paths C→XB, D→XB, and E→XB that are connected to the teleconferencing server B as 3.48%, 2.98%, and 1.30%, respectively (Step S123). More specifically, the CPU 10 specifies the path segments that make up the communication paths C→XB, D→XB, and E→XB, based on the access point device IDs that were acquired from the teleconferencing servers A, B at Step S41. The CPU 10 computes the total packet loss rate for each of the communication paths C→XB, D→XB, and E→XB by multiplying the packet survival rates for the path segments that make up each of the communication paths.

The CPU 10 also computes the average value of the total packet loss rates for the teleconferencing server A as 2.43% and computes the average value of the total packet loss rates for the teleconferencing server B as 2.59% (Step S125). The CPU 10 sets the teleconferencing server A, for which the average value is the smallest, as the recording server (Step S127).

As explained previously, in the teleconferencing system 100 according to the second embodiment, in the same manner as in the first embodiment, it is possible, based on the communication quality level of the network 8 for each of the teleconferencing servers 2, to cause the optimum teleconferencing server 2 to perform the recording of the teleconference. More specifically, the specification server 1 specifies, as the recording server, the teleconferencing server 2 that has the lowest packet loss rate for the data that are transmitted and received among the teleconferencing servers 2 and the teleconferencing terminals 3. Therefore, the teleconference can be recorded with a higher quality, while the packet loss rates that occur during network communication are limited. Moreover, using the average values for the plurality of packet loss rates that are measured for each of the plurality of teleconferencing terminals 3 not only makes it possible to specify the recording server based on more accurate packet loss rates, but also improves the quality of the recording of the teleconference.

A third embodiment of the present disclosure will be explained with reference to FIGS. 12 to 15. The third embodiment differs from the first and the second embodiments in the details of the method for setting the recording server. Hereinafter, only the points in the third embodiment that are different from the first and the second embodiments will be explained.

Figure 12:
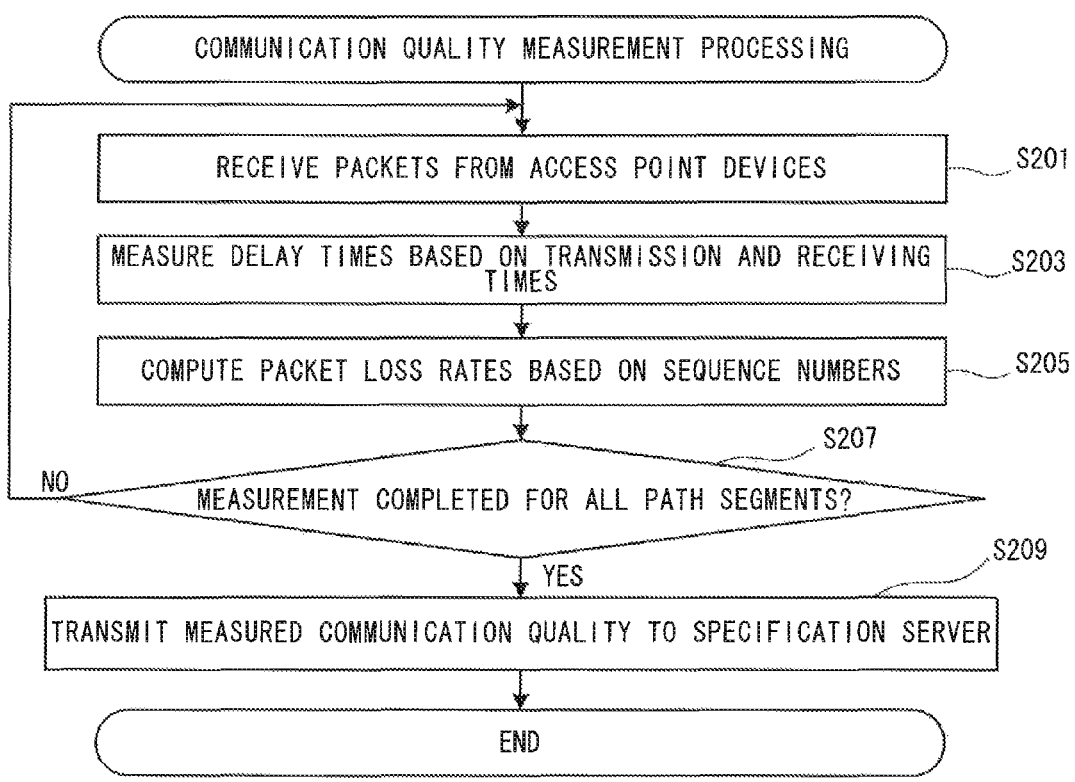
FIG. 12 is a flowchart of the communication quality measurement processing according to a third embodiment.

The communication quality measurement processing (Step S7) that is performed by each of the teleconferencing servers 2 in the third embodiment will be explained with reference to FIG. 12. First, in the same manner as at Step S21 in FIG. 4 and Step S101 in FIG. 9, the CPU 20 of the teleconferencing server 2 receives the packets from the access point devices (Step S201). Next, in the same manner as at Step S23 in FIG. 4, the CPU 20 measures the delay times based on the transmission and receiving times for the packets (Step S203). In the same manner as at Step S103 in FIG. 9, the CPU 20 also measures the packet loss rate based on the sequence numbers of the packets (Step S205).

Figure 9:
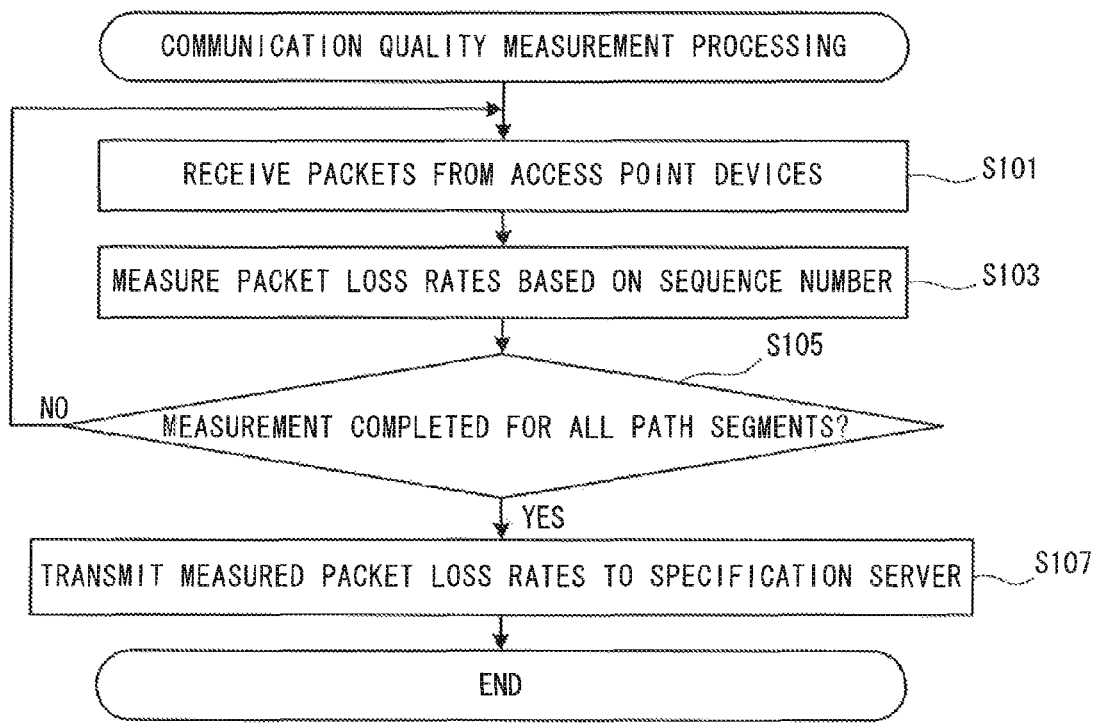
FIG. 9 is a flowchart of the communication quality measurement processing according to a second embodiment.
Figure 10:
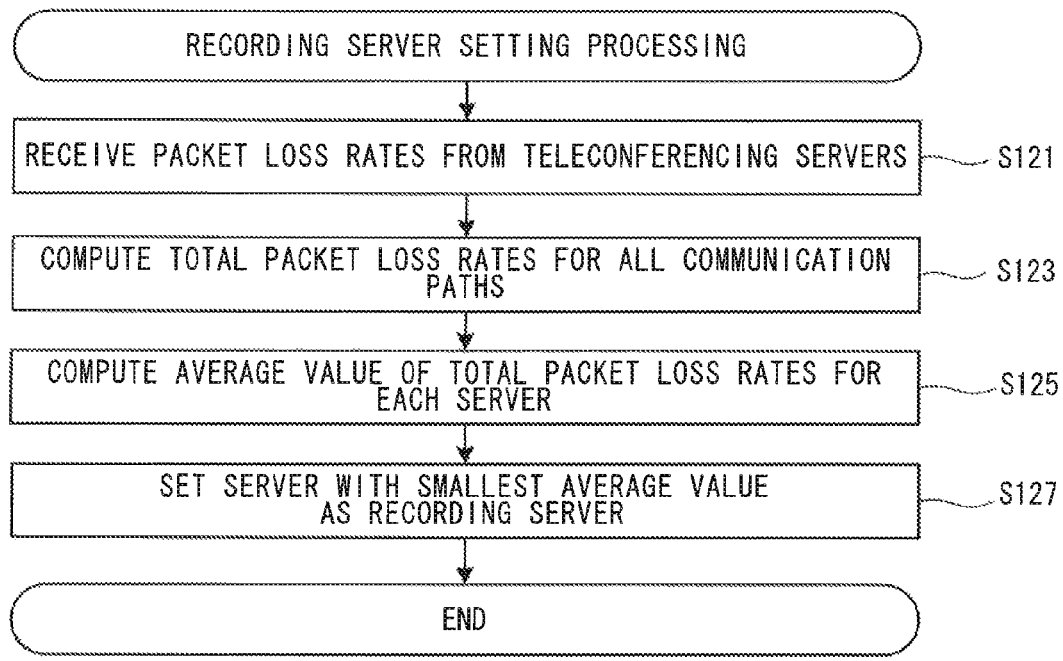
FIG. 10 is a flowchart of the recording server setting processing according to the second embodiment.

Next, in the same manner as at Step S25 in FIG. 4 and Step S105 in FIG. 9, the CPU 20 determines whether or not the measuring has been completed for all of the path segments (Step S207). In a case where the measuring has not been completed for all of the path segments (NO at Step S207), the processing returns to Step S201. In contrast, in a case where the measuring has been completed for all of the path segments (YES at Step S207), the CPU 20 transmits to the specification server 1 all of the delay times and the packet loss rates that have been measured for the individual path segments as the communication quality levels for the teleconferencing server 2 (Step S209). Then the communication quality measurement processing is terminated.

Figure 13:
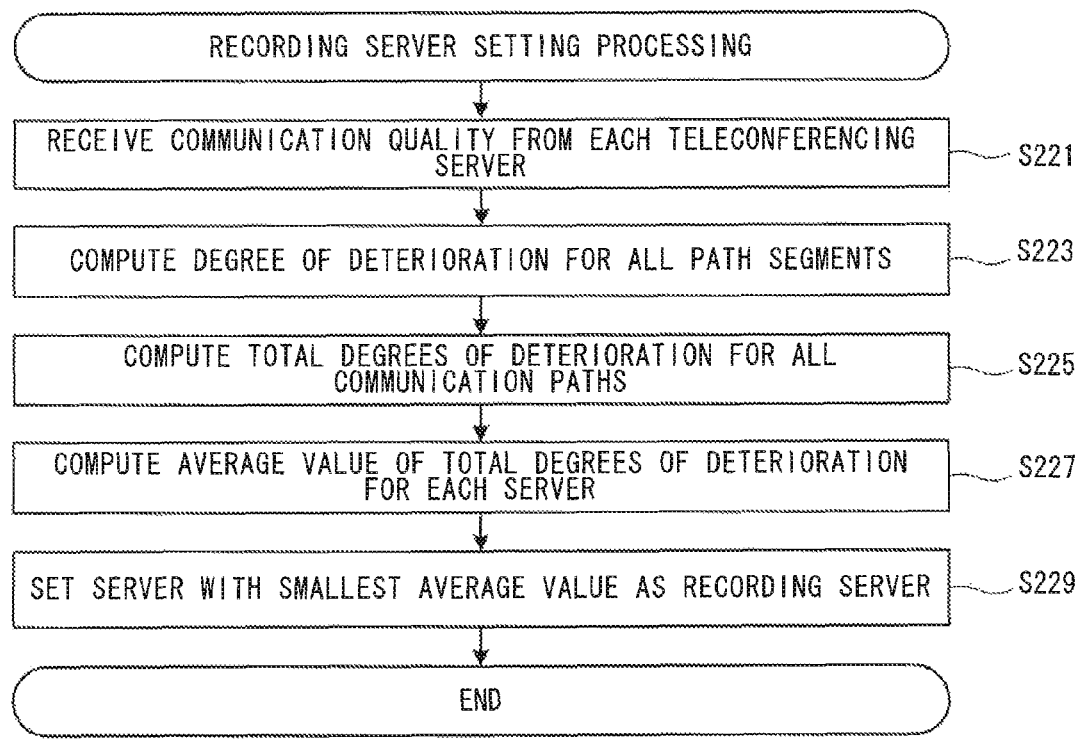
FIG. 13 is a flowchart of the recording server setting processing according to the third embodiment.

The recording server setting processing (Step S9) that is performed by the specification server 1 in the third embodiment will be explained with reference to FIG. 13. First, in the same manner as at Step S41 in FIG. 5 and Step S121 in FIG. 10, the CPU 10 of the specification server 1 receives the communication quality levels from each of the teleconferencing servers 2 that are participating in the teleconference (Step S221). Next, based on the communication quality levels that have been received from each of the teleconferencing servers 2, that is, based on the delay times and the packet loss rates, the CPU 10 computes a degree of deterioration in the communication quality level for each of the path segments (Step S223). The degree of deterioration indicates data reproducibility in comparison to a case in which the data that are relayed by the teleconferencing servers 2 are acquired in real time.

More specifically, the degree of deterioration for any one of the path segments indicates the reproducibility of the media data at the point when the media data were received by the teleconferencing server 2 through that path segment, the degree of deterioration being expressed as a percentage of the media data, on the assumption that 100% of the media data could be reproduced at the point when the media data were transmitted by the corresponding teleconferencing terminal 3. In other words, the greater the degree of deterioration, the lower the reproducibility of the media data becomes, and the worse the recording quality of the teleconference becomes. The degree of deterioration for any one of the path segments is specified based on the delay time and the packet loss rate for that path segment. Here, the delay time and the packet loss rate are indicators that assess the communication quality level from different viewpoints. Therefore, in the present embodiment, a quality correlation diagram like the example that is shown in FIG. 14 is used for assessing the delay time and the packet loss rate in terms of the single criterion of the degree of deterioration.

Figure 14:
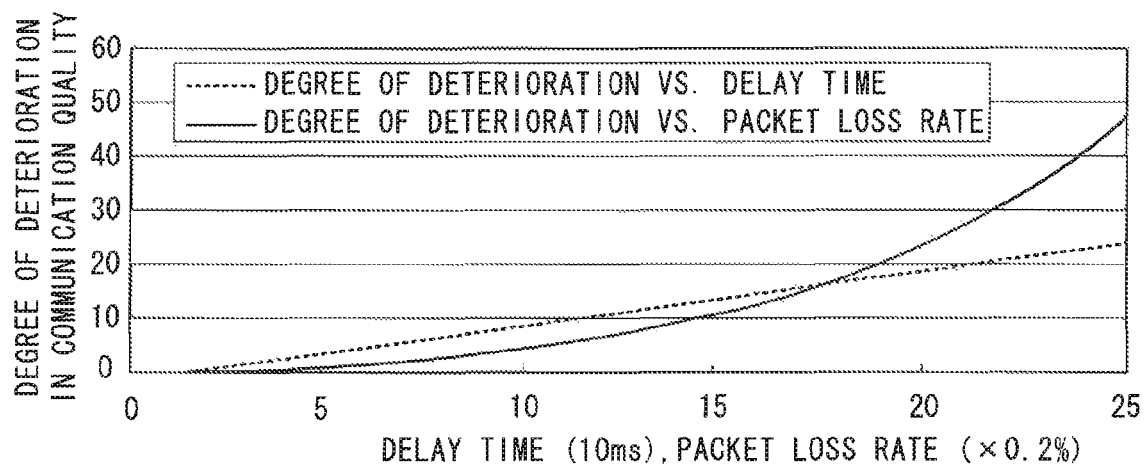
FIG. 14 is a correlation diagram of communication quality levels versus delay times and packet loss rates.

In the quality correlation diagram that is shown in FIG. 14, correlation curves that respectively correlate the delay time and the packet loss rate to the degree of deterioration in the communication quality level have been defined by experiments and calculations that were performed in advance. In FIG. 14, the horizontal axis indicates the delay time (×10 ms) and the packet loss rate (×0.2%), and the vertical axis indicates the degree of deterioration. The correlation curve that indicates the degree of deterioration that corresponds to the delay time is indicated by a broken line, and the correlation curve that indicates the degree of deterioration that corresponds to the packet loss rate is indicated by a solid line. At Step S223, the CPU 10 of the specification server 1 specifies the degrees of deterioration that respectively correspond to the delay time and the packet loss rate for each of the path segments, based on the quality correlation diagram that is shown in FIG. 14. The CPU 10 computes the degree of deterioration for the path segment as the sum of the degree of deterioration that corresponds to the delay time and the degree of deterioration that corresponds to the packet loss rate.

The CPU 10 computes the total degrees of deterioration for all of the communication paths, based on the degrees of deterioration that were computed for all of the path segments at Step S223 (Step S225). Specifically, for all of the communication paths that are formed between the teleconferencing servers 2 that conduct the teleconference and the teleconferencing terminals 3, the CPU 10 computes the total degree of deterioration that occurs on each individual communication path by adding up the degrees of deterioration for the path segments that make up that communication path. For each of the teleconferencing servers 2, the CPU 10 computes the average value of the total degrees of deterioration for all of the communication paths that are connected to that teleconferencing server 2 (Step S227). The CPU 10 sets the teleconferencing server 2 that has the smallest computed average value as the recording server (Step S229). Then the recording server setting processing is terminated.

A specific example of the method for setting the recording server according to the third embodiment will be explained in association with the communication quality measurement processing (FIG. 12) and the recording server setting processing (FIG. 13), with reference to FIG. 15. In order to facilitate understanding, the explanation that follows will use a table 70A that shows results of an evaluation of the communication quality levels for the teleconferencing server A and a table 70B that shows results of an evaluation of the communication quality levels for the teleconferencing server B.

When the teleconferencing server A performs the communication quality measurement processing (FIG. 12), the CPU 20 of the teleconferencing server A measures separately the delay times and the packet loss rates for the path segments C→A, D→A, and B→A (Steps S203, S205). In this example, the delay times for the path segments C→A, D→A, and B→A are all 200 milliseconds, and the packet loss rates are respectively 2.50%, 2.00%, and 1.50%. When the teleconferencing server B performs the communication quality measurement processing (FIG. 12), the CPU 20 of the teleconferencing server B measures separately the delay times and the packet loss rates for the path segments E→B and A→B (Steps S203, S205). In this example, the delay times for the path segments E→B and A→B are respectively 200 and 100 milliseconds, and the packet loss rates are respectively 1.30% and 1.00%.

As shown in the tables 70A, 70B, when the recording server setting processing (FIG. 13) is performed by the specification server 1, the CPU 10 of the specification server 1 computes separately the degrees of deterioration for the path segments C→A, D→A, B→A, E→B, and A→B (Step S223). In this example, the degrees of deterioration for the path segments C→A, D→A, B→A, E→B, and A→B are respectively 28.254%, 25.551%, 23.000%, 22.200%, and 11.600%.

Based on the degrees of deterioration for the path segments, the CPU 10 computes the total degrees of deterioration for the communication paths C→XA, D→XA, and E→XA for the teleconferencing server A as 28.254%, 25.551%, and 45.200%, respectively (Step S225). More specifically, the CPU 10 specifies the path segments that make up the communication paths C→XA, D→XA, and E→XA, based on the access point device IDs that were acquired from the teleconferencing servers A, B at Step S41. The CPU 10 computes the total degree of deterioration for each of the communication paths C→XA, D→XA, and E→XA by adding up the degrees of deterioration for the path segments that make up each of the communication paths.

In the same manner, the CPU 10 computes the total degrees of deterioration for the communication paths C→XB, D→XB, and E→XB for the teleconferencing server B as 39.854%, 37.151%, and 22.200%, respectively (Step S225). More specifically, the CPU 10 specifies the path segments that make up the communication paths C→XB, D→XB, and E→XB, based on the access point device IDs that were acquired from the teleconferencing servers A, B at Step S41. The CPU 10 computes the total degree of deterioration for each of the communication paths C→XB, D→XB, and E→XB by adding up the degrees of deterioration for the path segments that make up each of the communication paths.

The CPU 10 also computes the average value of the total degrees of deterioration for the teleconferencing server A as 33.002% and computes the average value of the total degrees of deterioration for the teleconferencing server B as 33.068% (Step S227). The CPU 10 sets the teleconferencing server A, for which the average value is the smallest, as the recording server (Step S229).

As explained previously, in the teleconferencing system 100 according to the third embodiment, in the same manner as in the first and the second embodiments, it is possible, based on the communication quality level of the network 8 for each of the teleconferencing servers 2, to cause the optimum teleconferencing server 2 to perform the recording of the teleconference. More specifically, based on the delay times and the packet loss rates for the data that are transmitted and received among the teleconferencing servers 2 and the terminals 3, the specification server 1 specifies the degrees of deterioration in the communication quality levels and then specifies, as the recording server, the teleconferencing server 2 that has the lowest specified degree of deterioration. Therefore, the teleconference can be recorded with a higher quality, while the delay times and the packet loss rates that occur during network communication are limited.

The present disclosure is not limited to the embodiments that have been described above, and modifications can be made within a scope in which they do not alter the substance of the disclosure. For example, the teleconferencing server 2 and the specification server 1 may also be configured from a single server. The recording server may also store the media data in an external storage device.

When the teleconference is started, the recording server may also start the recording of the teleconference automatically. For example, in the flowchart that is shown in FIG. 3, Steps S7, S9, S13, and S15 may be performed before Step S5 is performed, and the recording of the teleconference may be started at the same time that the teleconference is started. In that case, when measuring the communication quality (Step S7), the teleconferencing server 2 may measure the communication quality levels of the path segments by receiving the packets for the measurement from the access point devices before the teleconference starts.

The recording start command and the start request command may be transmitted and received through the same network 8 as the media data, and they may also be transmitted and received through a different network 8 from the media data. An example of a different network 8 from the media data would be a telephone circuit. The user may also input the recording start command and the start request command directly to the specification server 1, the teleconferencing server 2, or the like instead of through the network 8.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A teleconferencing system comprising:
    a plurality of teleconferencing servers that are configured to be connected to one another through a network;
    a plurality of teleconferencing terminals that are configured to conduct a teleconference by transmitting and receiving media data to and from one another, each one of the plurality of teleconferencing terminals being configured to be connected to at least one of the plurality of teleconferencing servers, and the media data including at least one of image data and audio data; and
    a specification server that is configured to be connected to the plurality of teleconferencing servers and that is configured to specify a recording server from the plurality of teleconferencing servers, the recording server being configured to record the media data,
    wherein each one of the plurality of teleconferencing servers comprises:
        a processor; and
        a memory storing computer-readable instructions therein, the computer-readable instructions, when executed by the processor of the teleconferencing server, instructing the processor of the teleconferencing server to perform processes comprising:
            relaying all of the media data that are transmitted and received by the teleconference;
            detecting a communication quality level for the network which passes the media data that are transmitted and received between the teleconferencing server and each one of plurality of teleconferencing terminals, the communication quality level being a plurality of delay times of the media data that are transmitted and received between the teleconferencing server and at least one of the teleconferencing terminals, the plurality of delay times respectively corresponding to a plurality of communication paths, each of the plurality of communication paths connecting each of the plurality of teleconferencing terminals to the teleconferencing server;
            transmitting to the specification server, through the network, the communication quality level that has been detected; and
            storing the media data that are relayed by the teleconferencing server in a storage device in response to receiving a recording start command, the recording start command being a command that instructs the recording server to start recording of the media data, and
    wherein the specification server comprises:
        a processor; and
        a memory storing computer-readable instructions therein, the computer-readable instructions, when executed by the processor of the specification server, instructing the processor of the specification server to perform processes comprising:
            receiving the communication quality levels transmitted from the plurality of teleconferencing servers;
            computing, based on the communication quality levels that have been received from the plurality of teleconferencing servers through the network, a value corresponding to a variance value of the plurality of delay times for each of the plurality of teleconferencing servers and specifying the teleconferencing server with the smallest value corresponding to the variance value as the recording server among the plurality of teleconferencing servers; and
            transmitting the recording start command through the network to the recording server that has been specified.

2. A teleconferencing system comprising:
    a plurality of teleconferencing servers that are configured to be connected to one another through a network;
    a plurality of teleconferencing terminals that are configured to conduct a teleconference by transmitting and receiving media data to and from one another, each one of the plurality of teleconferencing terminals being configured to be connected to at least one of the plurality of teleconferencing servers, and the media data including at least one of image data and audio data; and
    a specification server that is configured to be connected to the plurality of teleconferencing servers and that is configured to specify a recording server from the plurality of teleconferencing servers, the recording server being configured to record the media data,
    wherein each one of the plurality of teleconferencing servers comprises:
        a processor; and
        a memory storing computer-readable instructions therein, the computer-readable instructions, when executed by the processor of the teleconferencing server, instructing the processor of the teleconferencing server to perform processes comprising:
            relaying all of the media data that are transmitted and received by the teleconference;
            detecting a communication quality level for the network which passes the media data that are transmitted and received between the teleconferencing server and each one of the plurality of teleconferencing terminals, the communication quality level being a delay time and a packet loss rate for the media data that are transmitted and received between the teleconferencing server and the plurality of teleconferencing terminals;
            transmitting to the specification server, through the network, the communication quality level that has been detected; and
            storing the media data that are relayed by the teleconferencing server in a storage device in response to receiving a recording start command, the recording start command being a command that instructs the recording server to start recording of the media data, and
    wherein the specification server comprises:
        a processor; and
        a memory storing computer-readable instructions therein, the computer-readable instructions, when executed by the processor of the specification server, instructing the processor of the specification server to perform processes comprising:

receiving the communication quality levels transmitted from the plurality of teleconferencing servers;

computing, based on the communication quality levels that have been received from the plurality of teleconferencing servers through the network, a degree of deterioration of each of the plurality of teleconferencing servers and specifying the teleconferencing server with the smallest degree of deterioration as the recording server among the plurality of teleconferencing servers, the degree of deterioration indicates reproducibility of the media data in comparison to a case in which the media data that are relayed by the plurality of teleconferencing servers are acquired in real time; and transmitting the recording start command through the network to the recording server that has been specified.

3. A non-transitory computer-readable medium storing computer-readable instructions that, when executed by a processor of a specification server, cause the processor to perform processes comprising:

receiving communication quality levels for a network which passes media data that are transmitted and received among a plurality of teleconferencing servers and a plurality of teleconferencing terminals, the communication quality levels having been received through the network from the plurality of teleconferencing servers, the plurality of teleconferencing servers being configured to be connected to one another and to the specification server through the network, the plurality of teleconferencing terminals being configured to conduct a teleconference by transmitting and receiving the media data to and from one another, the media data including at least one of image data and audio data, each of the communication quality levels being a plurality of delay times of the media data that are transmitted and received between one of the plurality of teleconferencing servers and at least one of the plurality of teleconferencing terminals, the plurality of delay times respectively corresponding to a plurality of communication paths, each of the plurality of communication paths connects each of the plurality of teleconferencing terminals to one of the plurality of teleconferencing servers;

computing, based on the communication quality levels that have been received through the network, a value corresponding to a variance value of the plurality of delay times for each of the plurality of teleconferencing servers, and specifying a teleconferencing server with the smallest value corresponding to the variance value as a recording server among the plurality of teleconferencing servers, the recording server being configured to record the media data; and transmitting a recording start command through the network to the recording server that has been specified, the recording start command being a command that instructs the recording server to start recording of the media data.

4. A non-transitory computer-readable medium storing computer-readable instructions that, when executed by a processor of a specification server, cause the processor to perform processes comprising:

receiving communication quality levels for a network which passes media data that are transmitted and received among a plurality of teleconferencing servers and a plurality of teleconferencing terminals, the communication quality levels having been received through the network from the plurality of teleconferencing servers, the plurality of teleconferencing servers being configured to be connected to one another and to the specification server through the network, the plurality of teleconferencing terminals being configured to conduct a teleconference by transmitting and receiving the media data to and from one another, the media data including at least one of image data and audio data, each of the communication quality levels being a delay time and a packet loss rate for the media data that are transmitted and received between one of the plurality of teleconferencing servers and the plurality of teleconferencing terminals;

computing, based on the communication quality levels that have been received through the network, a degree of deterioration of each of plurality of teleconferencing servers and specifying a teleconferencing server with the smallest degree of deterioration as a recording server among the plurality of teleconferencing servers, the degree of deterioration indicates reproducibility of the media data in comparison to a case in which the media data that are relayed by the plurality of teleconferencing servers are acquired in real time, the recording server being configured to record the media data; and transmitting a recording start command through the network to the recording server that has been specified, the recording start command being a command that instructs the recording server to start recording of the media data.

\* \* \* \* \*